United States Patent
Lin (10) Patent No.: US 9,611,368 B2
(45) Date of Patent: Apr. 4, 2017

(54) PROCESS FOR MAKING A MONOMER SOLUTION FOR MAKING CATION EXCHANGE MEMBRANES

(75) Inventors: Juchui Ray Lin, Bedford, MA (US); Jenny Lin, legal representative, Bedford, MA (US)

(73) Assignee: Evoqua Water Technologies LLC

( * ) Notice: Subject to any disclaimer, the term of this patent is extended or adjusted under 35 U.S.C. 154(b) by 80 days.

(21) Appl. No.: 13/879,516

(22) PCT Filed: Oct. 17, 2011

(86) PCT No.: PCT/US2011/056516
§ 371 (c)(1),
(2), (4) Date: Aug. 15, 2013

(87) PCT Pub. No.: WO2012/051610
PCT Pub. Date: Apr. 19, 2012

(65) Prior Publication Data
US 2013/0317128 A1    Nov. 28, 2013

Related U.S. Application Data (60) Provisional application No. 61/393,770, filed on Oct. 15, 2010, provisional application No. 61/393,754, filed on Oct. 15, 2010.

(51) Int. Cl.
*C08J 5/22* (2006.01)
*B01D 67/00* (2006.01)
(Continued)

(52) U.S. Cl.
CPC ........ *C08J 5/2275* (2013.01); *B01D 67/0006* (2013.01); *B01D 69/10* (2013.01);
(Continued)

(58) Field of Classification Search
USPC .................................. 521/27; 252/182.17
See application file for complete search history.

(56) References Cited

U.S. PATENT DOCUMENTS 2,780,604 A    2/1957    Clarke et al.
3,009,895 A    11/1961   Slocombe
(Continued)

FOREIGN PATENT DOCUMENTS

CN    1114237 A    1/1996
CN    1986613 A    6/2007
(Continued)

OTHER PUBLICATIONS

J.C. Salamone et al: "Polymerization of Vinylpyridinium Salts. XIII. Preparation of CVinyl-N-Methylpyridinium pStyrenesulfonate Charge Transfer Ion-Pair Comonomer", Journal of Polymer Science: Polymer Letters Edition, vol. 23, pp. 655-659 (1985).*

(Continued)

*Primary Examiner* — Peter D Mulcahy
*Assistant Examiner* — Henry Hu (57) ABSTRACT

A method of making a monomer solution of styrene sulfonic acid or the pyridine salt of styrene sulfonic acid or mixtures of both in an organic solvent, said solution being suitable for producing cation exchange membranes. The method comprises the steps of dissolving a metal salt of styrene sulfonate in said organic solvent and pyridinium styrene sulfonate. The mixture solution is reacted under conditions that generate a salt byproduct precipitate and the reactant product solution is collected. Embodiments of the present invention provide for cation exchange membranes and processes for their manufacture. Membranes made by the processes described herein combine low resistance and high permselectivity which make them highly effective for membrane components in desalination of water by electrodialysis (ED), (Continued)

Construction of the membrane test cell and the reference electrode as a power generating sources in reverse electrodialysis and as separators in fuels cells.

18 Claims, 1 Drawing Sheet

(51) Int. Cl.
| | | |
|---|---|---|
| B01D 69/10 | (2006.01) | |
| B01D 71/28 | (2006.01) | |
| B01D 71/82 | (2006.01) | |
| B01D 61/42 | (2006.01) | |
| H01M 8/1018 | (2016.01) | |

(52) U.S. Cl.
CPC ............ *B01D 71/28* (2013.01); *B01D 71/82* (2013.01); *C08J 5/2206* (2013.01); *B01D 61/422* (2013.01); *B01D 2323/34* (2013.01); *B01D 2323/345* (2013.01); *B01D 2323/36* (2013.01); *B01D 2325/42* (2013.01); *H01M 8/1018* (2013.01); *H01M 2300/0082* (2013.01); *Y02P 70/56* (2015.11)

(56) References Cited

U.S. PATENT DOCUMENTS

| | | | |
|---|---|---|---|
| 3,549,016 A * | 12/1970 | Rigopulos | B01D 67/0011 210/500.33 |
| 3,737,045 A * | 6/1973 | Hashimoto et al. | 210/490 |
| 3,926,864 A | 12/1975 | Hodgdon, Jr. | |
| 4,231,855 A | 11/1980 | Hodgdon et al. | |
| 4,297,431 A | 10/1981 | Sullivan | |
| 4,585,833 A | 4/1986 | Domeier | |
| 4,704,324 A * | 11/1987 | Davis et al. | 428/308.4 |
| 4,778,601 A | 10/1988 | Lopatin et al. | |
| 4,828,772 A | 5/1989 | Lopatin et al. | |
| 4,874,567 A | 10/1989 | Lopatin et al. | |
| 4,933,405 A | 6/1990 | Evani | |
| 5,032,274 A | 7/1991 | Yen et al. | |
| 5,039,420 A | 8/1991 | Klein et al. | |
| 5,118,717 A | 6/1992 | Hodgdon et al. | |
| 5,120,632 A | 6/1992 | Bertrand et al. | |
| 5,145,618 A | 9/1992 | MacDonald et al. | |
| 5,194,189 A | 3/1993 | Papastavros et al. | |
| 5,264,125 A | 11/1993 | MacDonald et al. | |
| 5,380,413 A | 1/1995 | Posar et al. | |
| 5,401,408 A | 3/1995 | Umemura et al. | |
| 5,447,636 A | 9/1995 | Banerjee | |
| 5,510,394 A | 4/1996 | Hodgdon | |
| 5,714,521 A | 2/1998 | Kedem et al. | |
| 5,814,197 A | 9/1998 | Batchelder et al. | |
| 5,849,167 A | 12/1998 | Posar | |
| 5,868,976 A | 2/1999 | Puglia et al. | |
| 5,961,796 A | 10/1999 | Hitchens et al. | |
| 6,013,724 A | 1/2000 | Mizutani et al. | |
| 6,117,297 A | 9/2000 | Goldstein | |
| 6,217,733 B1 | 4/2001 | Hurwitz et al. | |
| 6,221,248 B1 | 4/2001 | Lin et al. | |
| 6,258,276 B1 | 7/2001 | Mika et al. | |
| 6,277,512 B1 | 8/2001 | Hamrock et al. | |
| 6,344,584 B2 * | 2/2002 | Lin et al. | 562/87 |
| 6,410,672 B1 | 6/2002 | MacDonald et al. | |
| 6,423,205 B1 | 7/2002 | Akahori et al. | |
| 6,596,137 B2 | 7/2003 | Nago et al. | |
| 6,723,758 B2 | 4/2004 | Stone et al. | |
| 6,814,865 B1 | 11/2004 | Aminabhavi et al. | |
| 6,828,386 B2 | 12/2004 | MacKinnon | |
| 6,830,671 B2 | 12/2004 | Aritomi et al. | |
| 6,849,688 B2 | 2/2005 | Hellums | |
| 6,851,561 B2 | 2/2005 | Wu et al. | |
| 6,924,318 B2 | 8/2005 | Mischi et al. | |
| 7,081,484 B2 | 7/2006 | Sugaya et al. | |
| 7,087,654 B2 | 8/2006 | MacDonald et al. | |
| 7,201,832 B2 | 4/2007 | Yamanaka et al. | |
| 7,247,370 B2 * | 7/2007 | Childs et al. | 428/310.5 |
| 7,316,919 B2 | 1/2008 | Childs et al. | |
| 7,318,972 B2 | 1/2008 | Highgate | |
| 7,368,200 B2 | 5/2008 | Zhu et al. | |
| 7,396,465 B2 | 7/2008 | Wu et al. | |
| 7,425,583 B2 | 9/2008 | Inoue et al. | |
| 7,449,111 B2 | 11/2008 | Hedhli et al. | |
| 7,514,481 B2 | 4/2009 | Yandrasits et al. | |
| 7,544,278 B2 | 6/2009 | Aminabhavi et al. | |
| 7,632,406 B2 | 12/2009 | Wilson et al. | |
| 7,649,025 B2 | 1/2010 | Kitamura et al. | |
| 7,674,505 B2 | 3/2010 | Kerres et al. | |
| 7,740,967 B2 | 6/2010 | Oren et al. | |
| 7,790,837 B2 | 9/2010 | McGrath et al. | |
| 7,829,218 B2 | 11/2010 | Endo et al. | |
| 7,833,644 B2 | 11/2010 | Chokai et al. | |
| 7,868,124 B2 | 1/2011 | Balland-Longeau et al. | |
| 7,888,397 B1 | 2/2011 | Hibbs et al. | |
| 7,893,303 B2 | 2/2011 | Yamakawa et al. | |
| 7,901,831 B2 | 3/2011 | Brunea | |
| 7,910,236 B2 | 3/2011 | Hommura et al. | |
| 7,923,166 B2 * | 4/2011 | Fukuta et al. | 429/492 |
| 7,931,995 B2 | 4/2011 | Bahar et al. | |
| 7,938,941 B2 | 5/2011 | Kashiwada et al. | |
| 7,947,196 B2 | 5/2011 | Lee et al. | |
| 7,959,780 B2 | 6/2011 | Hawkins et al. | |
| 7,968,663 B2 | 6/2011 | MacDonald et al. | |
| 7,977,392 B2 | 7/2011 | MacKinnon et al. | |
| 8,075,951 B2 | 12/2011 | Hammond-Cunningham et al. | |
| 8,114,550 B2 | 2/2012 | Suzuki et al. | |
| 8,349,155 B2 | 1/2013 | Umemura et al. | |
| 8,367,267 B2 | 2/2013 | Frey et al. | |
| 8,969,424 B2 | 3/2015 | Lin | |
| 2002/0019448 A1 | 2/2002 | Sugaya et al. | |
| 2002/0045085 A1 | 4/2002 | Formato et al. | |
| 2003/0024816 A1 | 2/2003 | Aritomi et al. | |
| 2003/0105173 A1 | 6/2003 | Sugaya et al. | |
| 2004/0175625 A1 | 9/2004 | Hedhli et al. | |
| 2004/0241518 A1 | 12/2004 | Yang | |
| 2005/0011826 A1 | 1/2005 | Childs et al. | |
| 2005/0250919 A1 | 11/2005 | Caneba et al. | |
| 2006/0000778 A1 | 1/2006 | Childs et al. | |
| 2006/0045985 A1 | 3/2006 | Kozak | |
| 2007/0020499 A1 | 1/2007 | Suzuki et al. | |
| 2007/0031716 A1 | 2/2007 | Rajendran | |
| 2007/0261962 A1 | 11/2007 | Gajek | |
| 2008/0023334 A1 | 1/2008 | Nakagawa et al. | |
| 2008/0223785 A1 | 9/2008 | Miller et al. | |
| 2009/0137757 A1 | 5/2009 | Imuta et al. | |
| 2009/0155370 A1 | 6/2009 | Cope et al. | |
| 2010/0056650 A1 | 3/2010 | Highgate | |
| 2010/0062313 A1 | 3/2010 | Browning et al. | |
| 2010/0065490 A1 | 3/2010 | Balster et al. | |
| 2010/0239946 A1 | 9/2010 | Miyachi et al. | |
| 2011/0020730 A1 | 1/2011 | Mizuno et al. | |
| 2011/0068002 A1 | 3/2011 | Lin et al. | |
| 2011/0097645 A1 | 4/2011 | Van Baak et al. | |
| 2011/0132762 A1 | 6/2011 | O' Brien et al. | |
| 2011/0189585 A1 | 8/2011 | Brunea | |
| 2011/0200907 A1 | 8/2011 | Moon et al. | |
| 2011/0203990 A1 | 8/2011 | Murphy et al. | |
| 2011/0224314 A1 | 9/2011 | MacDonald et al. | |
| 2011/0281197 A1 | 11/2011 | Daikoku et al. | |
| 2011/0290727 A1 | 12/2011 | Van Engelen | |
| 2012/0006685 A1 | 1/2012 | Van Engelen | |
| 2012/0014858 A1 | 1/2012 | Rowell | |
| 2012/0024697 A1 | 2/2012 | Antheunis et al. | |
| 2012/0031834 A1 | 2/2012 | Higa et al. | |
| 2012/0035280 A1 | 2/2012 | Jikihara et al. | |
| 2012/0248028 A1 | 10/2012 | Antheunis et al. | |
| 2012/0248029 A1 | 10/2012 | Antheunis et al. | |
| 2012/0248030 A1 | 10/2012 | Antheunis et al. | |
| 2012/0248032 A1 | 10/2012 | Van Berchum et al. | |
| 2012/0329891 A1 | 12/2012 | Lee et al. | |

FOREIGN PATENT DOCUMENTS

| | | |
|---|---|---|
| JP | 63-503074 A | 11/1988 |
| JP | 2001-157823 A | 6/2001 |

(56) References Cited

FOREIGN PATENT DOCUMENTS

| JP | 2005-334263 A | 12/2005 |
|---|---|---|
| JP | 2008-255351 A | 10/2008 |
| JP | 2008288065 A | 11/2008 |
| JP | 2009144041 A | 7/2009 |
| JP | 2009-173786 A | 8/2009 |
| JP | 2009-173828 A | 8/2009 |
| JP | 2009-215499 A | 9/2009 |
| JP | 2009-215500 A | 9/2009 |
| WO | 0193361 A2 | 12/2001 |
| WO | WO-01/93361 A2 * | 12/2001 |
| WO | 03008078 A2 | 1/2003 |
| WO | 2004073843 A1 | 9/2004 |
| WO | 2005102503 A1 | 11/2005 |
| WO | 2010007399 A1 | 1/2010 |
| WO | 2010013861 A1 | 2/2010 |
| WO | 2010106356 A1 | 9/2010 |
| WO | 2010106357 A1 | 9/2010 |
| WO | 2011025867 A1 | 3/2011 |
| WO | 2012051608 A1 | 4/2012 |
| WO | 2012051610 A1 | 4/2012 |
| WO | WO-2012/051610 A1 * | 4/2012 |
| WO | 2012081026 A2 | 6/2012 |
| WO | 2013014420 A1 | 1/2013 |
| WO | 2013052227 A1 | 4/2013 |

OTHER PUBLICATIONS

Pandey, Ashok K. et al., "Formation of Pore-Filled Ion-Exchange Membranes within Situ Crosslinking: Poly (Vinylbenzyl Ammonium Salt)-Filled Membranes", Journal of Polymer Science Part A: Polymer Chemistry, vol. 39, No. 6, Mar. 15, 2001.

J.C. Salamone et al: "Polymerization of Vinylpyridinium Salts. XIII. Preparation of CVinyl-N-Methylpyridinium pStyrenesulfonate Charge Transfer Ion-Pair Comonomer", Dec. 31, 1985, XP055104794, Retrieved from the Internet: URL:http://onlinelibrary.wiley.com/store/10.1002/pol.1985.130231210/asset/130231210_ftp.pdf? v-1&t-hs6a53wy&s-e4772bb8729bf774cd920c40734d5b18cad056d1 [retrieved on Feb. 27, 2014] *p. 656, paragraph 7* *p. 658, paragraph 3*.

* cited by examiner

Construction of the membrane test cell and the reference electrode

PROCESS FOR MAKING A MONOMER SOLUTION FOR MAKING CATION EXCHANGE MEMBRANES

This application claims the benefits of U.S. provisional applications 61/393,770 and 61/393,754 filed on Oct. 15, 2010.

FIELD

Embodiments of the present invention provide for a process for making a monomer containing solution suitable for making a cation exchange membranes and the cation exchange membranes produced from these solutions and processes for their manufacture.

BACKGROUND

Cation exchange membranes transport cations under an electrical or chemical potential. A cation exchange membrane will have fixed negative charges and mobile positively charged cations. Ion exchange membrane properties are controlled by the amount, type and distribution of the fixed ionic groups. Strong acid cation exchange membranes usually have sulfonic acid groups as the charged group, whereas for weak acid membranes, carboxylic acid typically make up the fixed charged group.

Among the most important applications of ion exchange membranes are desalination of water by electrodialysis (ED), as a power generating sources in reverse electrodialysis and as separators in fuels cells. Other applications include recovery of metal ions in the electroplating and metal finishing industries and various applications in the food and beverage industry.

Electrodialysis desalinates water by transferring ions and some charged organics through paired anion- and cation selective membranes under the motive force of a direct current voltage. An ED apparatus consists of electrically conductive and substantially water impermeable anion selective and cation selective membranes arranged as opposing walls of a cell. Adjacent cells form a cell pair. Membrane stacks consist of many, sometime hundreds of cell pairs, and an ED systems may consist of many stacks. Each membrane stack has a DC (direct current) anode at one end of the stack and a DC cathode at the other end. Under a DC voltage, ions move to the electrode of opposite charge.

A cell pair consists of two types of cells, a diluting cell and a concentrating cell. As an illustrative example, consider a cell pair with a common cation exchange membrane wall and two anion exchange membrane walls forming the two cells. That is, a first anion exchange membrane and the cation exchange membrane form the dilute cell and the cation exchange membrane and a second anion membrane form the concentrating cell. In the diluting cell, cations will pass through the cation exchange membrane facing the anode, but be stopped by the paired anion exchange membrane of the concentrating cell in that direction facing the cathode. Similarly, anions pass through the anion exchange membrane of the diluting cell facing the cathode, but will be stopped by the cation exchange membrane of the adjacent pair facing the anode. In this manner, salt in a diluting cell will be removed and in the adjacent concentrating cells cations will be entering from one direction and anions from the opposite direction. Flow in the stack is arranged so that the dilute and concentrated flows are kept separate and a desalinated water stream is produced from the dilute flow.

In the ED process, material commonly builds up at the membrane surface in the direction of the electric field, which can, and usually does reduce process efficiency. To combat this effect, Electrodialysis reversal (EDR) was developed and is the primary method of use presently. In EDR, the electrodes are reversed in polarity on a regular basis, for example, every fifteen to sixty minutes. The dilute and concentrate flows are simultaneously switched as well, the concentrate becoming the dilute flow and vice versa. In this way fouling deposits are removed and flushed out.

Once the concentration in the dilution cells falls to lower than about 2000 milligrams/liter (mg/l), electrical resistance is at a level that power demand becomes increasing expensive. To overcome this, and to be able to produce high quality water, electrodeionization (EDI), sometimes called continuous electrodeionization (CEDI) was developed. In this method the cells are filled with ion exchange media, usually ion exchange resin beads. The ion exchange media is orders of magnitude more conductive than the solution. The ions are transported by the beads to the membrane surface for transfer to the concentrate cells. EDI is capable of producing purer water then ED at less power when the feed concentration is reduced sufficiently.

ED processes for water desalination have advantages over RO. They require less pretreatment which will reduce operating costs. They will have higher product water recovery and a higher brine concentration, i.e., there is less brine to dispose.

Univalent selective or monovalent selective membranes primarily transfer monovalent ions. Monovalent selective cation exchange membranes primarily transfer sodium, potassium, etc. Likewise, monovalent selective anion membranes transfer ions such as chloride, bromide, nitrate etc.

Reverse osmosis (RO) dominates the production of fresh water from seawater by membrane processes. While electrodialysis (ED) is used for brackish water and waste water desalination, it is generally considered too expensive for seawater use. In order to be competitive with RO, ED and EDR will require membrane resistance of less than 1 ohm-$cm^2$, preferably less than 0.8 ohm-$cm^2$, and most preferably less than 0.5 ohm-$cm^2$. Ion permselectivity of greater than 90%, more preferably greater than 95%, and most preferably greater than 98% is desired. The membrane has to have long service life, and be physically strong and chemically durable and be low cost.

Reverse electrodialysis (RED) converts the free energy generated by mixing the two aqueous solutions of different salinities into electrical power. The greater the difference in salinity, the greater the potential for power generation. For example, researchers have studied RED using Dead Sea water and fresh or seawater. Researchers in Holland have mixed river water entering the sea and seawater. RED membranes preferably will have a low electrical resistance and a high co-ion selectivity and long service life time, acceptable strength and dimensional stability and, importantly, low cost.

The polymer electrolyte membrane (PEM) is a type of ion exchange membrane that serves both as the electrolyte and as a separator to prevent direct physical mixing of the hydrogen from the anode and oxygen supplied to the cathode. A PEM contains negatively charged groups, usually sulfonic acid groups, attached or as part of the polymer making up the PEM. Protons migrate through the membrane by jumping from one fixed negative charge to another to permeate the membrane.

PEM's requirements include chemical, thermal and electrochemical stability, and adequate mechanical stability and strength when swollen and under mechanical stress. Other requirements include low resistance, low or preferably no methanol transport in direct methanol fuel cells (DMFC), and low cost.

Bipolar membranes are made of a cation exchange and an anion exchange membrane laminated or bound together, sometimes with a thin neutral layer between. Under an electric field water is split into H+ and OH− ions. The hydroxyl ions are transported through the anion exchange membrane and the H+ ions through the cation exchange layer and will form base and acid in the respective cells. Organic acids are also made using bipolar membranes.

Development of ion exchange membranes requires an optimization of properties in order to overcome competing effects. Ion exchange membranes for water desalination traditionally have had to meet four main characteristics to be considered successful. These are;
  Low electrical resistance to reduce potential drop during operation and to increase energy efficiency
  High permselectivity—that is, high permeability to counter-ions but approximately impermeable to co-ions
  High chemical stability—ability to withstand pH from 0 to 14 and oxidizing chemicals
  Mechanical strength—The membrane must be able to withstand the stresses of being handled while being manufactured into a module or other processing device. The membrane must also have good dimensional stability in operation and not swell or shrink excessively when the fluid contacting it changes concentration or temperature.

Membrane developers have recognized that for a given chemistry used to make an ion exchange membrane, a thinner membrane would give a lower resistance and also allow more membrane area per unit volume of device. However, thinner membranes are more susceptible to dimensional change from environmental effects, such as changes in ionic concentration of the fluids contacting them or operating temperature changes. Moreover, to develop and produce defect-free membranes is more difficult for the case of thinner membranes because there is less margin of error during membrane production as there is for thicker membranes where the membrane thickness covers over defects that may occur in membrane formation.

It is known that alkali metal salts of p-styrenesulfonate can be industrially produced by the reaction of p-β-haloethylbenzenesulfonic acid with an alkali metal hydroxide, where the halo may be Cl or Br. When such an alkali metal salt of p-styrenesulfonate is copolymerized by free radical polymerization in an ion exchange membrane formulation, it is essential those alkali metal salts of p-styrenesulfonate have excellent solubility in a typical aprotic solvent such as N-methylpyrrolidone (NMP) in order to make a cation exchange membrane (CEM) with high ion exchange capacity and low water content so that the said membrane can be used as a monopolar membrane and as a part of a bipolar membrane that has high efficiency in an electrodialysis (ED) stack to effectively and economically produce acid and base during a salt splitting process or be able to remove minerals ions from chess and whey products.

U.S. Pat. No. 4,029,640 disclosed a process for producing ammonium p-styrenesulfonate or a polymer thereof which comprises reacting by double decomposition an alkali metal p-styrenesulfonate or a polymer thereof with an inorganic ammonium salt in a medium which is an alcohol or a mixture of a hydrophilic organic solvent and water. However this process is limited due to the solubility of the alkali metal salts of p-styrenesulfonate, which is limited to less than 40 parts in relation to 100 parts of medium. In another word, it is preferred to be limited in 2-20 parts of an inorganic ammonium salt in a medium of 100 parts. This severely restricted a membrane formulator's ability to design a cation exchange membrane to have water contents of less than 70%. This translated to an extremely low efficiency CEM, if one is to make it from one-step radical polymerization using a mixture of salts of p-styrenesulfonate, crosslinker(s) and solvent(s).

U.S. Pat. No. 5,203,982 claimed a cation exchange membrane prepared by polymerizing a homogeneous solution of a mixture of polymerizable monomers, said mixture comprising one or more water soluble, monomeric, styrene sulfonate ammonium salts and divinyl benzene, said mixture in one or more mutual solvents for said one or more styrene sulfonate ammonium salts and divinyl benzene, said one or more mutual solvents comprising from about 20 to about 60 percent by volume of said solution and characterized by substantially swelling the polymerized mixture of said polymerizable monomers, said one or more mutual solvents selected from the group consisting of solvents having boiling points in the commercially pure state of not less than about 100° C.

In the example 3 of U.S. Pat. No. 6,344,584, it disclosed a high capacity CEM prepared using a lithium styrene sulfonate (LiSS) and NMP of up to 45% solubility of LiSS, also in the formulation is a 29% Divinylbenzene (DVB, 80% divinyl content, Dow Chemicals) of overall weight of mixture.

All of the above examples demonstrate a common scheme of the salt of styrene sulfonated being used so far has limited solubility in solvents and therefore it is hard to obtain an ultra high capacity, high efficiency and low water content CEM based on all of the above.

To this inventor's surprise, when pyridinium chloride was used to ion exchange the sodium ion of styrene sulfonate to produce a pyridinium styrene sulfonate and sodium chloride salt, in NMP or NMP/DVB mixture, and subsequently filtered out the by-product sodium chloride, much better NMP solubility of the product pyridinium styrene sulfonate was obtained. Therefore, it is now possible to product high capacity and high efficiency CEM based on styrene sulfonate-side-chain which is also stable in all range of pH, and suitable for using it as a building block of a bipolar ED stack or a Whey ED stack.

Improvements in membrane properties are also desired. The inventor has found simple direct methods to increase the purity and solubility of styrene sulfonate monomers in organic solvents and to reduce the water content of the resultant solution. With such solutions improved cation exchange membranes have been made and shown to produce improved membranes.

SUMMARY

Described herein is a method of making a monomer solution of styrene sulfonic acid or the pyridine salt of styrene sulfonic acid or mixtures of both in an organic solvent, said solution being suitable for producing cation exchange membranes, comprising the steps of;
  a) forming a first suspension of a metal salt of styrene sulfonate in said organic solvent, b) adding a pyridinium salt, preferably a chloride salt to said first suspension to form a mixture suspension, c) causing the mixture suspension to react to form a monomer solution of styrene sulfonic acid or the pyridine salt of styrene sulfonic acid or mixtures of both in said organic solvent, under conditions that generate a metal salt byproduct precipitate, said solution being suitable for producing cation exchange membranes, d) optionally removing volatile pyridine byproducts and other volatile species such as water from the solution under conditions that volatilize less than about 5% of said organic solvent by weight, e) and collecting the reactant solution, preferably after separation from the byproduct precipitate.

Embodiments of the invention contain up to about 50% styrene sulfonate ion by weight in the produced monomer solution after metal salt byproduct precipitation Embodiments of the invention contain up to about 70% styrene sulfonate ion by weight in the produced monomer solution after metal salt byproduct precipitation The inventive solutions are used in a novel process for making cation exchange membranes for electrodialysis.

The membranes are produced by a process comprising choosing a suitable porous substrate, saturating the porous regions of the substrate with a solution saturating the porous regions of the substrate with a solution comprising a styrene sulfonic acid or the pyridine salt of styrene sulfonic acid or mixtures of both, each made by the process comprising of the steps;

a) forming a first suspension of a metal salt of styrene sulfonate in said organic solvent, b) adding a pyridinium salt, preferably a chloride salt to said first suspension to form a mixture suspension, c) causing the mixture suspension to react to form a monomer solution of styrene sulfonic acid or the pyridine salt of styrene sulfonic acid or mixtures of both in said organic solvent, under conditions that generate a metal salt byproduct precipitate, said solution being suitable for producing cation exchange membranes, d) optionally removing volatile pyridine byproducts and other volatile species such as water from the solution under conditions that volatilize less than about 5% of said organic solvent by weight, e) and collecting the reactant solution, preferably after separation from the byproduct precipitate.

and optionally at least one secondary monomer, optionally a crosslinking monomer, and a polymerization initiator.

In an embodiment the porous substrate is saturated with one or more monomers of styrene sulfonic acid or the pyridine salt of styrene sulfonic acid or mixtures of both in an organic solvent made by steps a. through e., a neutral monomer, a multifunctional crosslinking monomer, and a polymerization initiator, followed by the steps of removing excess solution from the surfaces of the substrate while leaving the porous volume saturated with solution, initiating polymerization by the application of heat, ultraviolet light, or ionizing radiation, optionally in the absence of substantially all oxygen, to form a crosslinked ion transferring polymer substantially completely filling the pores of the substrate.

The microporous support preferably comprises microporous membranes of polypropylene, high molecular weight polyethylene, ultrahigh molecular weight polyethylene or polyvinylidene fluoride. The supports are preferably not greater than about 55 microns in thickness, more preferably not thicker than 25 microns.

DETAILED DESCRIPTION

Styrene sulfonic acid or its metal salts are used to manufacture cation exchange membranes. International Application #PCT/US10/46777 incorporated in its entirety by reference describes a method of making ion exchange membranes produced by polymerizing one or more monofunctional ionogenic monomers with at least one multifunctional monomer in the pores of a porous substrate. Practitioners desiring to apply the teachings of the 10/46777 application with styrene sulfonates, or to make other ion exchange products will want as pure materials as possible and will want the ability to use high solution concentrations of the monomer. These attributes will aid in making materials with a high concentration of ion exchange sulfonate groups.

It is well known to practitioners that NaSS, sodium styrene sulfonate, has a solubility in N-methylpyrrolidone (NMP) and other aprotic solvents limited to about 5.6% (w/w). This limits the ability of membrane development scientists to make a low resistance leakfree cation exchange membrane. The inventor has discovered that by using the inventive process described herein, solutions of up to about 45% (w/w) solubility in NMP can be produced which translate into the ability to make superior cation exchange membranes.

The inventor has discovered that high purity styrene sulfonic acid (SSA) and pyridinium styrene sulfonate (PSS) may be obtained by the methods herein. In the methods described, a metal salt of styrene sulfonate is reacted with pyridinium chloride (Pyridine hydrochloride CAS#628-13-7). Sodium styrene sulfonate (4-styrene sulfonic acid sodium salt; CAS #2695-37-6) is a preferred monomer.

In one case, sodium styrene sulfonate (Spinomer NaSS—Tosoh Corporation Tokyo Japan) is dissolved in N-methylpyrrolidone (NMP) and pyridine chloride added and dissolved. The solution is heated at over 80° C. for several hours, and water and pyridine evaporate to give a clear golden colored solution after filtration of sodium chloride precipitated by-product. Upon standing in a refrigerator for a length of time, throws off needle-like crystals which are identified as styrene sulfonic acid by nuclear magnetic resonance (NMR) analysis.

If the above reaction is done at a temperature below 80° C. under reflux, a clear greenish yellow solution results after NaCl precipitation and filtration and the crystals formed after a refrigerated standing are found to be pyridinium styrene sulfonate.

By adapting the conditions of the reaction, mixtures of SSA and PSS may be formed. Minor amounts of NaSS may remain as well.

The preferred styrene sulfonate metal salt is sodium. Potassium calcium and magnesium salts may be used.

In the methods described, a preferred class of solvents is dipolar aprotic solvents. Without being limited, some examples of suitable solvents include dimethylacetamide, dimethylformamide, dimethylsulfoxide, hexamethylphosphoramide or -triamide. A most preferred solvent is N-methyl pyrrolidone.

The pyridine counter ion may be a halide i.e. bromide fluoride, or iodide. The preferred counterion is chloride. Substituted pyridines may be used such as without being limited to the following examples, 2-methylpyridine 2- or 3-propyl pyridine or 2-butyl- or 4 tertiary butyl pyridine.

At least one secondary monomer is 2-sulfoethylmethacrylate (2-SEM or 2-acrylamide-2-methyl propane sulfonic acid (AMPS) or acrylic acid. Optionally, at least one secondary monomer is selected from the group consisting of styrene, vinyl toluene, 4-methylstyrene, t-butyl styrene, alphamethylstyrene; methacrylic anhydride, methacrylic acid, n-vinyl-2-pyrolidone, vinyltrimethoxysilane, vinyltriethoxysilane, vinyl-tris-(2-methoxyethoxy)silane, vinylidene chloride, vinylidene fluoride, vinylmethyldimethoxysilane, 2,2,2,-trifluoroethyl methacrylate, maleic anhydride, glycidyl methacrylate, hydroxyethylmethacrylate, methylmethacrylate, epoxycyclohexyl-POSS® cage mixture (Hybrid Plastics, EP04080) $((C_8H_{13}O)_n(SiO_{1.5})_n$, wherein n=8, 10, or 12), glycidyl-POSS® cage mixture (Hybrid Plastics, EP0409) $((C_6H_{11}O_2)_n(SiO_{1.5})_n$, wherein n=8, 10, or 12), methacryl POSS® Cage Mixture (Hybrid Plastics, MA0735) $((C_7H_{11}O_2)_n(SiO_{1.5})_n$, wherein n=8, 10, or 12), Acrylo POSS® Cage Mixture (Hybrid Plastics, MA0736) $((C_6H_9O_2)_n(SiO_{1.5})_n$, wherein n=8, 10, or 12), tris sulfonic acid ethyl POSS® (Hybrid Plastics SA1532) $(C_{56}H_{104}O_{30}S_3Si_{10})$, Trisulfonic Acid Isobutyl POSS® (Hybrid Plastics, SA1533) $(C_{70}H_{132}O_{30}S_3Si_{10})$.

The at least one crosslinker is divinylbenzene or ethylene glycol dimethacrylate.

Optionally, at least one crosslinker is propylene glycol dimethacrylate, isobutylene glycol dimethacrylate, Octavinyl POSS® (OL1160), Octavinyldimethylsilyl POSS® (OL1163), Vinyl POSS® Mixture (OL1170), OctaVinyl POSS® (OL1160), Trisilabolethyl POSS® (SO1444), Trisilanolisobutyl POSS® (O1450), Trisilanolisooctyl POSS® (SO1455), Octasilane POSS® (SH1310), or Octahydro POSS® (SH1311) [Hybrid Plastics Hattiesberg MS].

The polymerization initiator is preferably selected from the group consisting of organic peroxides, 2,2'-azobis[2,(2-imidazolin-2-yl)-propane]dihydrochloride, a,a'-azoisobutyronitrile, 2,2'-azobis(2-methylpropioaminidine)dihydrochloride, 2,2'-azobis[2,(2-imidazolin-2-yl)-propane], or dimethyl 2,2'-azobis(2-methylpropionate).

The inventor was surprised by the fact that crosslinker such as divinylbenzene may also be added to the monomer solution during the controlled styrene sulfonic ion solution synthesis without causing gel formation of the monomer solution. By being able to add the crosslinker at this stage the process of making a membrane is simplified.

An important finding is that the by-products of the reaction must be removable and that the styrene sulfonate remain in solution at operational temperatures usually ambient, approximately 20° C.-30° C. Higher temperatures may be used to increase solubility. The preferred combination of sodium styrene sulfonate and pyridinium chloride produces an insoluble sodium chloride precipitate and the soluble sulfonate pyridinium salt. Without being limited by the following, the inventor believes that that pyridinium salt provides enhanced solubility which translates into better polymerization reactivity which translates into better polymerization reactivity, therefore tighter (pinhole free) membrane film formation.

The reaction allows for a variety of outcomes. For example, if the molar ratio of sodium styrene sulfonate to pyridinium chloride is less than one, a mixture of sodium and pyridinium counterions will result. By using a molar excess of pyridinium chloride complete reaction is assured and the excess pyridinium chloride may be removed by volatilization of pyridine.

A person skilled in the art of membrane development and manufacturing will realize that this convenient laboratory method can be adapted to other laboratory scaled methods and may be scaled up to continuous manufacturing.

For example, the substrate pore filling or saturation may be done at a slightly elevated temperature (>40° C.) to reduce air solubility, or this step could be done after a mild vacuum treatment of the substrate sample submerged in the formulation solution. Substrate samples may be presoaked and then placed on the polyester or similar sheet and covered with a covering sheet and smoothed out to remove air bubbles. Several presoaked pieces may be layered and then placed on the polyester or similar sheet and covered with a covering sheet and smoothed out to remove air bubbles.

Rather than heating in an oven, the saturated substrate sandwich may be placed on a heated surface at a temperature sufficient and for a time necessary to initiate and complete polymerization. Alternate methods for initiation of the polymerization reaction may be used. Ultraviolet light or ionizing radiation, such as gamma radiation or electron beam radiation may be used to initiate the polymerization reaction.

Low resistance reduces the electrical energy required to desalinate and lowers operating cost. Specific membrane resistance is measured in Ohm-centimeters ($\Omega$cm). A more convenient engineering measure is Ohm-cm$^2$($\Omega$cm$^2$). Area resistance may be measured by using a cell having two electrodes of known area, platinum or black graphite are typically used, with the membrane sample of known area between them in an electrolyte solution. The electrodes do not touch the membrane. Membrane area resistance is estimated by subtracting the electrolyte resistance without the membrane from the test result with the membrane in place. The resistance may also be measured by determining a voltage vs. current curve in a cell having two well stirred chambers separated by the membrane. A calomel electrode measures the potential drop across the membrane. The slope of the potential drop vs. current curves, which may be obtained by varying voltage and measuring current. Electrochemical impedance may also be used. In this method, alternating current is applied across the membrane. Measurement at a single frequency gives data relating to electrochemical properties of the membrane. By using frequency and amplitude variations, detailed structural information may be obtained. Herein, resistance will be defined by the methods described in the Experimental section.

Apparent permselectivity refers to the relative transport of counterions to co-ions during electrodialysis. For an ideal cation exchange membrane only positively charged ions would pass the membrane, giving a permselectivity of 1.0. Apparent permselectivity is found by measuring the potential across the membrane while it separates monovalent salt solutions of different concentrations. The method and calculations used herein are described in the Experimental section.

To meet these initial goals the inventors developed a type of composite ion exchange membrane in which a crosslinked polymer having charged ionic groups attached is contained in the pores of a microporous membrane substrate. The porous membrane substrate is preferably less than about approximately 155 microns thick, more preferably less than about approximately 55 microns thick.

Substrate membranes having porosity greater than about 45% are preferred, with those having porosities greater than about 60% more preferred. In the most preferred embodiments, the substrate membranes have porosities greater than about 70%. Preferred substrate membranes have a rated pore size of from about approximately 0.05 microns to about approximately 10 microns, with a more preferred range of from about approximately 0.1 microns to about approximately 1.0 microns. Most preferred porous substrates have a rated pore size of from about approximately 0.1 microns to about approximately 0.2 microns.

Microporous membrane supports may be manufactured from polyolefins, blends of polyolefins, polyvinylidene fluoride, or other polymers. A class of preferred substrates comprises thin polyolefin membranes manufactured primarily for use as battery separators. A more preferred substrate class are thin battery separators manufactured from ultrahigh molecular weight polyethylene (UHMWPE).

To produce the desired ion exchange membranes, the inventors developed a method of placing the crosslinked charged polymer in the pores of the substrate by polymerizing the crosslinked polymer in these pores. The method involved saturating the porous substrate with a solution of charged monomer, multifunctional monomer, (e.g., a crosslinking agent) and polymerization initiator. Herein we use the term ionogenic monomer to mean a monomer species having at least one charged group covalently attached. The charged group can be positively charged or negatively charged. In an embodiment, the crosslinked polymer was produced by polymerizing a multifunctional charged monomer. The Polymerization was initiated by heat or by UV light, preferably with a polymerization initiator such as a free radical initiator. Monofunctional monomers are monomers which have a single site for carrying forward the polymerization reaction. Multifunctional monomers have more than one polymerization reaction site and so can form networked or crosslinked polymers.

The following laboratory method was used to investigate formulation and process effects by producing small coupons for resistivity and permselectivity testing. Porous membrane substrate 43 mm diameter coupons were die cut. Somewhat larger discs (50 mm or 100 mm diameter) of transparent polyester sheets were also die cut. A 105 mm aluminum weighing boat was typically used to hold a set of coupons. The coupons were sandwiched between two polyester film discs. First, substrate coupons were thoroughly wetted with a monomer solution to make up a test sample. This was done by adding the formulated solution to the aluminum boat, and immersing a polyester film disc with a substrate coupon layered on it into the solution so that the porous support is saturated. The saturated support was then removed from the monomer solution and placed on a piece of polyester film. Air bubbles were removed from the coupon by, for example, smoothing or squeezing the coupon with a convenient tool, such as a small glass rod, or by hand. A second polyester disc was then layered on top of the first coupon and smoothed to have complete surface contact between the coupon and the lower and upper polyester film layers. A second porous substrate was then layered on the upper polyester film and the saturation, smoothing and addition of an over layer of polyester film repeated to give a multilayer sandwich of two coupons and three protective polyester film layers. A typical experimental run would have a multilayered sandwich of 10 or more saturated substrate coupon layers. The rim of the aluminum boat can be crimped down to hold the disc/coupon assembly if required.

The boat and assembly were then placed in a sealable bag, typically a zip-lock polyethylene bag and a low positive pressure of inert gas, usually nitrogen, added before sealing the bag. The bag containing the boat and coupon assembly is placed into an oven at 80° C. for up to about 60 minutes. The bag is then removed and cooled, and the now reacted cation exchange membrane coupons are placed in 0.5N NaCl solution at 40° C.-50° C. for at least 30 minutes, with NaCl soak of up to 18 hours being found satisfactory.

EXPERIMENTAL EXAMPLES

The following examples are meant to illustrate the extent of effort expended in developing the subject membranes. The finding resulted in showing that ion exchange membranes having the desired properties could be made and that improvements are possible with further experimentation. These results are meant to be illustrative and to indicate developmental directions to those skilled in the art of membrane development and associated arts and not to be limiting as to the extent of the matter disclosed herein.

In the following examples, a general initial procedure was used;

Weighed amounts of NaSS was added to the solvent to form a suspension or slurry and then pyridinium chloride was added, as well as other ingredients other charged and/or neutral monomers, crosslinking monomers, initiator(s) and transfer agents as planned by the inventor) and the mixture heated and or otherwise reacted to form a clear colored solution.

Example 1

Production of Pyridinium Styrene Sulfonate and CEM

In an 8 oz jar with 61.1 g of NaSS, 29.92 g of pyridinium chloride, 44.38 g of NMP, 47.25 g of DVB-80, and 0.42 g of MEHQ. This mixture was heated to 76° C. for 100 minutes with reflux then allowed to slowly cool with stirring for 18 hours and then filtered at 15° C. using a vacuum pump aspirator. Yield: 133.45 g of clear greenish yellow solution. The filtered. NaCl was dried in 90° C. oven for 70 hours; weight: 41.68 g.

To 50.43 g of the solution obtained above was added 0.35 gm of Vazo-64 (DuPont). Coupons of Teklon HPIP, APorous H6A, Celgard EZ2090, Celgard EZ2590, Solupor 10P05A and Solupor 16P10A were each soaked for 45 minutes, then they were sandwiched between Mylar disks, and any air bubbles in the sandwich were removed by pressing. The sandwich was placed inside an aluminum weighing dish, the dish put into a Ziploc® or similar sealable plastic bag, and pressurized with nitrogen gas. the Ziploc® bag was placed it in an 90° C. oven for 45 minutes.

Example 1 starts with 0.296 moles of NaSS and 0.259 moles of pyridinium chloride. The ending solution totals 133.5 grams which contains at least 0.259 moles of the pyridinium salt of styrene sulfonate. That pyridinium salt has a molecular weight of 263 so there are 0.259×263=68.3 grams of the salt in 133.5 grams of solution or 51% based on solution weight. Based on styrene sulfonate ion, MW=183.2 there is 40.6% sulfonate ion.

Each membrane coupon thus made was placed in 0.5 N NaCl (aq) for conditioning. A Solartron electrochem tester was set up as described earlier and used to obtain resistivity and apparent perm selectivity.

Table 1 shown the results of area resistance in Ohm $cm^2$ of CEM thus made and their apparent permselectivity %:

TABLE 1

| Description | R(ohm $cm^2$) | Apparent Permselectivity |
| --- | --- | --- |
| Celgard EZ2090 | 12.291 | 99.86 |
| Celgard EZ2590 | 5.640 | 99.35 |
| Teklon HPIP 1 pf | 35.231 | 101.52 |
| Aporous H6A 1 pf | 3.173 | 100.36 |
| Solupor 10P05A | 2.420 | 100.02 |
| Solupor 16P1OA 1pf | 1.506 | 94.35 |

Example 2

CEM Made from a Mixture of PySS, 2-SEM DVB, AA and NMP

In a 40 ml vial charged with 7.38 g of acrylic acid, was dissolved. 7.6 g of NMP, added 7.4 g of DVB-80, and 0.15 g of Vazo-64 (DuPont) to obtain a crystal clear pale yellow solution.

To 20.09 g of the Vazo-64 doped solution from Example 1 was added 2.6 g of the solution from above and 3.10 g of 2-SEM (2-sulfoethylmethacrylate), Evan Chemetics), Stirred to a homogeneous mixture at room temperature. Coupons of Teklon HPIP, APorous H6A, Celgard EZ2090, Celgard EZ2590, Solupor 10P05A and Solupor 16P1OA then they were sandwiched between Mylar disks, and any air bubbles in the sandwich were removed by pressing. The sandwich was placed inside an aluminum weighing dish, the dish put into a Ziploc® bag, and pressurized with nitrogen gas. The Ziploc® bag was placed it in an 90° C. oven for 45 minutes.

Each membrane coupon thus made was placed in 0.5 N NaCl (aq) for conditioning. A Solartron electrochem tester was set up as described and used to obtain resistivity and apparent permselectivity.

Using a Solartron electrochem tester and a set up as described earlier,

Table 2 shows the results of area resistance in Ohm cm$^2$ of CEM thus made and their apparent permselectivity.

TABLE 2

| Substrate | R(ohm cm$^2$) | Apparent Permselectivity |
|---|---|---|
| Celgard EZ2090 | .686 | 97.69 |
| Celgard EZ2590 | .816 | 99.85 |
| Teklon HPIP | 1.870 | 101.84 |
| Aporous H6A | .988 | 101.51 |
| Solupor 1OP05A | 1.562 | 102.84 |
| Solupor 16P1OA | 2.118 | 102.3 |

Example 3

Synthesis of Pyridinium Styrene Sulfonate (PySS)

To 50.22 g of NaSS in an 8 oz jar, 26.40 g of pyridinium chloride and 26.30 g of NMP were added. The solution was heated at 40-75° C. for 6 hours with stirring and refluxing and then allowed to slowly cool with stirring for 18 hours. Precipitated NaCL was filtered out at room temperature using a vacuum pump aspirator, Yield: 61 g of clear greenish yellow solution. The filtered cake after drying in an 80° C. oven for 6 days weighed 31.10 g.

The clear greenish yellow solution was held in a refrigerator overnight, forming some flake-like crystals. The crystals were filtered it using a vacuum pump aspirator; yield 58.5 g of remaining solution and 2.6 grams of precipitated crystals.

In this example, there are initially 0.244 moles NaSS. If this is considered as sulfonate ion MW=183.2 then there are 73% sulfonate in the 61.1 grams of the final clear solution.

Example 4

20.03 g of the PySS in NMP solution from example 3 was poured into a 4 oz jar, and to this was added 3.57 g DVB-80, 3.8 g vinylbenzyl chloride (VBC), 1.91 g NMP and 0.17 g Vazo 64. Coupons of Teklon HPIP, and 16P10A were soaked in the mixture for 30 minutes, then they were sandwiched between polyester (Mylar) sheet disks, and any air bubbles between the Mylar disks were removed by pressing and the sandwich placed inside an aluminum weighting dish. The dish was put into a Ziploc® bag, pressurized with nitrogen gas and placed in a 90° C. oven for 1 hour.

The samples were removed from the bag and washed with ethanol, isopropanol, ethanol, respectively for 30 minutes and then placed in 0.5 N NaCl at 80° C. for conditioning for 30 minutes, repeated with fresh 0.5 N NaCl solution at 80° C. conditioning for another 30 minutes and repeated at room temperature with a fresh NaCl solution.

Table 3 shown the results of area resistance in Ohm cm$^2$ of CEM thus made and their apparent permselectivity %:

TABLE 3

| | Area Resistance | |
|---|---|---|
| Teklon HPIP, 1 pf | 13.365 | 95.49 |
| Solupor 16P10A, | 12.465 | 96.22 |

Example 5

A 4 oz jar containing 24.34 g of NaSS, 11.82 g of pyridinium chloride, and 15.05 g of NMP was heated at 60° C. for 20 minutes with stirring and then allow to cooled to 45° C. for 90 minutes. The solution was heated to 105° C. in 15 minutes, and then cooled to 95° C. without refluxing. The temperature was held at approximately 95° C. for the next 75 minutes, and cooled to 52° C. followed by vacuum filtration to obtained 30 ml of clear yellow solution. The filtered cake, i.e. NaCl by-product after drying in an 80° C. oven for 60 hours, yielded 16.82 g. To 13.32 grams of the clear yellow solution above, was added 3.82 g DVB, and 0.1 g Vazo-64. Vacuum filtered the solution once more to obtain 19.01 g of yellow clear mix. Coupons of Teklon HPIP, APorous H6A, Celgard EZ2090, Celgard EZ2590, were soaked in the mixture for 30 minutes, then they were sandwiched between polyester sheets and any air bubbles between the polyester sheets removed by pressure. The sandwiches were placed in an aluminum weighting dish, which were placed in a Ziploc bag, pressurized with nitrogen gas and placed in an 80° C. oven for 60 minutes. The membrane coupon thus made was placed in 0.5 N NaCl (aq) for conditioning.

Table 4 shows the results of area resistance in Ohm cm$^2$ of CEM thus made and their apparent % permselectivity (also shown are commercially available cation exchange membrane CMX from Astom-Japan, 125 mm

TABLE 4

| Porous Substrate | Area Resistance (Ohm cm$^2$) | Apparent Permselectivity % |
|---|---|---|
| Astom CMX | 3.027 | 104.59 |
| Solupor 1OP05A 1 pf | 1.340 | 100.67 |
| Solupor 16P1OA 1 pf | 1.453 | 99.51 |
| Teklon HPIP 1 pf | 2.605 | 101.41 |
| Celgard EZ2590 1 pf | 0.701 | 97.37 |
| Celgard EZ2090 1 pf | 3.657 | 99.59 |

Example 6

2 g of the ultimate solution made in example 5 was added to the solution from Example 1 and 0.273 g Vazo-64 added to obtained a total of 42.127 g of mix. To 13.0 g of this mix was added 2.33 gm of a mixture made from 7.38 gm of acrylic acid (AA) in 7.6 g of NMP and 7.4 g of DVB (80% divinyl) and 0.15 gm of Vazo-64.

Coupons of Teklon HPIP, APorous H6A, Celgard EZ2090, Celgard EZ2590, Solupor 1OP05A and Solupor 16P1OA were each soaked for 25 minutes, then they were sandwiched between Mylar disks, and any air bubbles in the sandwich were removed by pressing. The sandwich was placed inside an aluminum weighing dish, the dish put into a Ziploc bag, and pressurized with nitrogen gas. The Ziploc® bag was placed it in an 80 C oven for 60 minutes.

The membrane coupon thus made was placed in 0.5 N NaCl (aq) for conditioning.

Table 5 shows the results of area resistance in Ohm $cm^2$ of CEM thus made and their apparent % permselectivity: (also shown are commercially available ion exchange membrane CMX from Astom-Japan, 125 mm)

TABLE 5

| | Area Resistance | |
|---|---|---|
| CMX | 2.821 | 104.77 |
| Aporous H6A 1 pf | 2.442 | 98.44 |
| Solupor 1OP05A 1 pf | 2.386 | 99.84 |
| Celgard EZ2590 1 pf | 0.777 | 94.73 |
| Teklon HPIP 1 pf | 3.288 | 100.75 |
| Celgard EZ2090 1 pf | 1.760 | 95.22 |

Example 7

A 8 oz jar containing 50.10 g of NaSS, 24.01 g of pyridinium chloride, 44.65 g of NMP and 25.50 g of DVB (80% divinyl) was heated from 50° C. to 70° C. for 6 hours with reflux and then cooled to 28° C. Precipitated NaCL was filtered out at 15° C. using a vacuum pump aspirator. Yield: 108.50 g of clear greenish yellow solution obtained. The filtered NaCl cake after drying in an 80° C. oven for 70 hours, weighed 24.43 g.

98.75 g of the solution obtained above was double filtered and to it was added 1.09 gm of Vazo-64. The solution was used to soak coupons of Teklon HPIP, APorous H6A, Celgard EZ2090, Celgard EZ2590, Solupor 1OP05A and Solupor 16P1OA 45 minutes. The coupons were then sandwiched between Mylar disks, air bubbles in between the Mylar sheets removed by pressure, and the sandwich placed inside an aluminum weighting dish, the dish placed in a Ziploc bag, which was pressurized with nitrogen. The bags were placed it in an 80° C. oven for 1 hour. The membrane coupons thus made were placed in 0.5 N NaCl (aq) for conditioning.

Table 6 shows the results of area resistance in Ohm $cm^2$ of CEM thus made and their apparent permselectivity. (also shown are commercially available ion exchange membrane CMX from Astom-Japan, 125 mm)

TABLE 6

| | Area Resistance | |
|---|---|---|
| CMX | 2.368 | 106.50 |
| Celgard EZ2090 | 1.568 | 96.69 |
| Celgard EZ2590 | 0.568 | 90.38 |
| Teklon HPIP | 3.343 | 97.52 |
| APorous H6A | 1.479 | 94.20 |
| Solupor 16P05A | 1.384 | 93.20 |
| Solupor 16P1OA | 1.793 | 93.20 |

Structure of Precipitated Crystals

In a 40 ml vial 12.1 g of NaSS was combined with 5.85 g of pyridinium chloride and 1.0.90 g of NMP. The mixture was heated to 80-90° C. with open vial for 100 minutes then allowed to slowly cool with stirring for 2 hours. It was filtered at room temperatures using a vacuum pump aspirator. Yield: 14.62 g of clear teak colored solution. The NaCl precipitate filtered cake after drying in 90° C. oven for 70 hours had a weight of 5.63 g. After the solution was stored in a refrigerator for 35 days needle-like crystals mixed with small amount of flake crystals were observed. The crystals were filtered from the solution and washed them with cyclohexane and dried. We obtained 0.17 gm out of 7.5 gm mother liquor. The needle like crystals was sent for NMR analysis.

Crystals were dissolved in DMSO-d6 and it spun in a 400 MHz proton NMR instrument at Spectral Data Service, Inc. at Champaign, Ill. A single peak representative of the proton from sulfonic acid at was seen 4.074 ppm.

To another 40 ml vial, 12.1 g of NaSS, 5.83 g of pyridinium chloride, 10.02 g of NMP were added and heated to 50-70° C. with the vial lid closed for 3 hours. The clear solution on top turned clear and greenish. It was allowed to slowly cool-off with stirring for 2 hours and then filtered at room temperatures using a vacuum pump aspirator. Yield: 12 g of clear greenish solution. After being stored in a refrigerator for 22 days, transparent flake-like crystals were observed mixed with small amount of needle-like crystals. The crystals from the solution were filtered and washed with cyclohexane and dried, obtaining 0.14 g. The flake-like crystals was sent for NMR analysis. The crystals were dissolved in DMSO-d6 and spun in a 400 MHz proton NMR instrument at Spectral Data Service, Inc. at Champaign, Ill. Data shown absence of single peak of the proton from sulfonic acid at 4.074 ppm, a clear sign of pyridinium styrene sulfonate crystals were formed.

Example 8

Production of Pyridinium Styrene Sulfonate and CEM

In an 8 oz jar with 61.1 g of NaSS, 29.92 g of pyridinium chloride, 44.38 g of NMP, 47.25 g of DVB-80, and 0.42 g of MEHQ. This mixture was heated to 76° C. for 100 minutes with reflux then allowed to slowly cool with stirring for 18 hours and then filtered at 15° C. using a vacuum pump aspirator. Yield: 133.45 g of clear greenish yellow solution. The filtered NaCl was dried in an 90° C. oven for 70 hours; weight: 41.68 g.

To 50.43 g of the solution obtained above was added 0.35 gm of Vazo-64 (DuPont). Coupons of Teklon APorous H6A, Celgard EZ2090, Celgard EZ2590, Solupor 1OP05A and Solupor 16P1OA. were each soaked for 45 minutes, then they were sandwiched between Mylar disks, and any air bubbles in the sandwich were removed by pressing. The sandwich was placed inside an aluminum weighing dish, the dish put into a Ziploc bag, and pressurized with nitrogen gas. the Ziplok bag was placed it in an 90° C. oven for 45 minutes.

Example 1 starts with 0.296 moles of NaSS and 0.259 moles of pyridinium chloride. The ending solution totals 133.5 grams which contains at least 0.259 moles of the pyridinium salt of styrene sulfonate. That pyridinium salt has a molecular weight of 263 so there are 0.259×263=68.3 grams of the salt in 133.5 grams of solution or 51% based on solution weight. Based on styrene sulfonate ion, MW=183.2 there is 40.6% sulfonate ion.

Each membrane coupon thus made was placed in 0.5 N NaCl (aq) for conditioning. A Solartron electrochem tester was set up as described earlier and used to obtain resistivity and apparent permselectivity.

The porous substrates used in these examples are given in the Table 7 below;

TABLE 7

Porous Substrates

| Trade name | Manufacturer | Material | Rated pore Size | Thickness microns | Porosity % |
|---|---|---|---|---|---|
| APorous H6A | APorous Billerica MA | HDPE | 0.1 | 52 | 68 |
| APorous S14 | | HDPE | 0.1 | 84 | 77 |
| Ahlstrom (Hollytex) 3329 | Wall Township, New Jersey | polyester | | 200 | |
| Teklon HPIP32 | Entek Lebanon, OR | UHMWPE | | 32 | 48 |
| Delpore 6002 | Delstar Middleton DE | meltblown | | | |
| Delstar 6SLG | Delstar Middleton DE | | | | |
| Novatexx 2413 | Freudenberg Hopkinsville, KY | polyester | | | |
| Celgard EZ2090 | CELGARD Charlotte NC | pp | | | |
| Celgard EZ2590 | CELGARD Charlotte NC | pp | | 32 | 45 |
| Solupor 16P5A | Lydall Filtration Rochester NH | UHMWPE | 0.5 | 115 | 83% |
| Solupor 16P10A | Lydall Filtration Rochester NH | UHMWPE | 0.9 | 120 | 85% |

Table 8 shown the results of area resistance in Ohm cm$^2$ of CEM thus made and their apparent permselecetivity %:

TABLE 8

| Description | R(ohm cm$^2$) | Apparent Permselectivity |
|---|---|---|
| Celgard EZ2090 | 12.291 | 99.86 |
| Celgard EZ2590 | 5.640 | 99.35 |
| Teklon HPIP 1 pf | 35.231 | 101.52 |
| Aporous H6A 1 pf | 3.173 | 100.36 |
| Solupor 1OP05A | 2.420 | 100.02 |
| Solupor 16P1OA 1pf | 1.506 | 94.35 |

Example 9

CEM Made from a Mixture of PySS, 2-SEM DVB, AA and NMP

In a 40 ml vial charged with 7.38 g of acrylic acid, was dissolved 7.6 g of NMP, added 7.4 g of DVB-80, and 0.15 g of Vazo-64 (DuPont) to obtain a crystal clear pale yellow solution.

To 20.09 g of the Vazo-64 doped solution from Example 1 was added 2.6 g of the solution from above and 3.10 g of 2-SEM (2-sulfoethylmethacrylate), Evan Chemetics). Stirred to a homogeneous mixture at room temperatures. Coupons of Teklon HPJP, APorous Celgard EZ2090, Celgard EZ2590, Solupor 1.0P05A and Solupor 16P1OA then they were sandwiched between Mylar disks, and any air bubbles in the sandwich were removed by pressing. The sandwich was placed inside an aluminum weighing dish, the dish put into a Ziploc bag, and pressurized with nitrogen gas. The Ziplok bag was placed it in an 90° C. oven for 45 minutes.

Each membrane coupon thus made was placed in 0.5 N NaCl (aq) for conditioning. A Solartron electrochem tester was set up as described and used to obtain resistivity and apparent perm selectivity.

Using a Solartron electrochem tester and a set up as described earlier, Table 9 shows the results of area resistance in Ohm cm$^2$ CEM thus made and their apparent permselectivity.

TABLE 9

| Description | R(ohm cm$^2$) | Apparent Permselectivity |
|---|---|---|
| Celgard EZ2090 | .686 | 97.69 |
| Celgard EZ2590 | .816 | 99.85 |
| Teklon HPIP | 1.870 | 101.84 |
| Aporous H6A | .988 | 101.51 |
| Solupor 1OP05A | 1.562 | 102.84 |
| Solupor 16P1OA | 2.118 | 102.3 |

Example 10

Synthesis of Pyridinium Styrene Sulfonate (PySS)

To 50.22 g of NaSS in an 8 oz jar, 26.40 g of pyridinium chloride and 26.30 g of NMP were added. The solution was heated at 40-75° C. for 6 hours with stirring and refluxing and then allowed to slowly cool with stirring for 18 hours. Precipitated NaCl, was filtered out at room temperature using a vacuum pump aspirator. Yield: 61 g of clear greenish yellow solution. The filtered cake after drying in an 8° C. oven for 6 days weighed 31.10 g.

The clear greenish yellow solution was held in a refrigerator overnight, forming some flake-like crystals. The crystals were filtered it using a vacuum pump aspirator; yield 58.5 g of remaining solution and 2.6 grams of precipitated crystals.

In this example, there are initially 0.244 moles NaSS. If this is considered as sulfonate ion MW=1.83.2 then there are 73% sulfonate the 61.1 grams of the final clear solution.

Example 11

20.03 g of the PySS in NMP solution from example 3 was poured into a 4 oz jar, and to this was added 3.57 g DVB-80, 3.8 g vinylbenzyl chloride (VBC), 1.91 g NMP and 0.17 g Vazo 64. Coupons of Teklon HPIP, and 16P10A were soaked in the mixture for 30 minutes, then they were sandwiched by Mylar disk, air bubbles in between the Mylar disks were removed by pressing and the sandwich placed inside an aluminum weighting dish. The dish was put into a Ziploc hag, pressurized with nitrogen gas and placed in a 90° C. oven for 1 hour.

The samples were removed from the bag and washed with ethanol, isopropanol, ethanol, respectively for 30 minutes and then placed in 0.5 N NaCl at 80° C. for conditioning for 30 minutes, repeated with fresh 0.5 N NaCl solution at 80° C. conditioning for another 30 minutes and repeated at room temperature with a fresh NaCl solution.

Table 10 shown the results of area resistance in Ohm cm$^2$ of CEM thus made and their apparent permselectivity %:

TABLE 10

| | Area Resistance | |
|---|---|---|
| Teklon HPIP, 1 pf | 13.365 | 95.49 |
| Solupor 16P10A, | 12.465 | 96.22 |

Example 12

A 4 oz jar containing 24.34 g of NaSS, 11.82 g of pyridinium chloride, and 15.05 g of NMP was heated at 60° C. for 20 minutes with stirring and then allowed to cool to 45° C. for 90 minutes. The solution was heated to 105° C. in 15 minutes, and then cooled to 95° C. without refluxing. Keep temperature at approximately 95° C. for the next 75 minutes, and cooled to 52° C. followed by vacuum filtration to obtained 30 ml of clear yellow solution. The filtered cake, i.e. NaCl by-product after drying in an 80° C. oven for 60 hours yielded 16.82 g. Took 13.32 g of the clear yellow solution above, added it 3.82 g DVB and 0.1 g Vazo-64. Vacuum filtered the solution once more to obtain 19.01 g of yellow clear mix. Coupons of Teklon HPIP, APorous H6A, Celgard EZ2090, Celgard EZ2590, air bubbles between the Mylar sheets removed by pressure. The sandwiches were placed in an aluminum weighting dish, which were placed in a Ziploc bag, pressurized with nitrogen gas and placed in an 80° C. oven for 60 minutes. The membrane coupon thus made was placed in 0.5 N NaCl (aq) for conditioning.

Table 11 shows the results of area resistance in Ohm cm$^2$ of CEM thus made and their apparent % permselectivity (also shown are commercially available cation exchange membrane CMX from Astom-Japan, 125 mm)

TABLE 11

| Porous Substrate | Area Resistance (Ohm cm$^2$) | Apparent Permselectivity % |
|---|---|---|
| Astom CMX | 3.027 | 104.59 |
| Solupor 1OP05A 1 pf | 1.340 | 100.67 |
| Solupor 16P1OA 1 pf | 1.453 | 99.51 |
| Teklon HPIP 1 pf | 2.605 | 101.41 |
| Celgard EZ2590 1 pf | 0.701 | 97.37 |
| Celgard EZ2090 1 pf | 3.657 | 99.59 |

Example 13

2 g of the ultimate solution made in example 5 was added to the solution from Example 1 and 0.273 g Vazo-64 added to obtained a total of 42.127 g of mix. To 13.0 g of this mix was added 2.33 gm of a mixture made from 7.38 gm of acrylic acid (AA) in 7.6 g of NMP and 7.4 g of DVB (80% divinyl) and 0.15 gm of Vazo-64.

Coupons of Teklon HPIP, APorous H6A, Celgard EZ2090, Celgard EZ2590, Solupor 1OP05A and Solupor 16P1OA. were each soaked for 25 minutes, then they were sandwiched between Mylar disks, and any air bubbles in the sandwich were removed by pressing. The sandwich was placed inside an aluminum weighing dish, the dish put into a Ziploc, bag, and pressurized with nitrogen gas. The Ziplok bag was placed it in an 80 C oven for 60 minutes.

The membrane coupon thus made was placed in 0.5 N NaCl (aq) for conditioning.

Table 12 shows the results of area resistance in Ohm cm$^2$ of CEM thus made and their apparent % perm selectivity: (also shown are commercially available ion exchange membrane CMX from Astom-Japan, 125 mm)

TABLE 12

| | Area Resistance | |
|---|---|---|
| CMX | 2.821 | 104.77 |
| Aporous H6A 1 pf | 2.442 | 98.44 |
| Solupor 1OP05A 1 pf | 2.386 | 99.84 |
| Celgard EZ2590 1 pf | 0.777 | 94.73 |
| Teklon HPIP 1 pf | 3.288 | 100.75 |
| Celgard EZ2090 1 pf | 1.760 | 95.22 |

Example 14

A 8 oz jar containing 50.10 g of NaSS, 24.01 g of pyridinium chloride, 44.65 g of NMP and 25.50 g of DVB (80% divinyl) was heated from 50° C. to 70° C. for 6 hours with reflux and then cooled to 28° C. Precipitated NaCL was filtered out at 15° C. using a vacuum pump aspirator. Yield: 108.50 g of clear greenish yellow solution obtained. The filtered NaCl cake after drying in an 80° C. oven for 70 hours, weighted 24.43 g.

98.75 g of the solution obtained above was double filtered and to it was added 1.09 gm of Vazo-64. The solution was used to soak coupons of Teklon HPIP, APorous H6A, Celgard EZ2090, Celgard EZ2590, Solupor 1OP05A and Solupor 16P1OA 45 minutes. The coupons were then sandwiched between Mylar disks, air bubbles in between the Mylar sheets removed by pressure, and the sandwich placed inside an aluminum weighting dish, the dish placed in a Ziploc bag, which was pressurized with nitrogen. The bags were placed it in an 80° C. oven for 1 hour. The membrane coupons thus made were placed in 0.5 N NaCl (aq) for conditioning.

Table 13 shows the results of area resistance in Ohm cm$^2$ of CEM thus made and their apparent permselectivity. (also shown are commercially available ion exchange membrane CMX from Astom-Japan, 125 mm)

TABLE 13

| | Area Resistance | |
|---|---|---|
| CMX | 2.368 | 106.50 |
| Celgard EZ2090 | 1.568 | 96.69 |
| Celgard EZ2590 | 0.568 | 90.38 |
| Teklon HPIP | 3.343 | 97.52 |
| APorous H6A | 1.479 | 94.20 |
| Solupor 16P05A | 1.384 | 93.20 |
| Solupor 16P1OA | 1.793 | 93.20 |

Example 15

16 g of the final NMP solution from example 3 was poured into a 4 oz jar, and to this was added 4.10 g DVB-80, 0.64 g EP0409 (Hybrid Plastics, Glycidyl-POSS® (CAS

68611-45-0), and 0.103 g Vazo 64. Coupons of 16P10A substrate were soaked in the mixture for 30 minutes, then they were sandwiched by Mylar disk, air bubbles in between the Mylar disks were removed by pressing and the sandwich placed inside an aluminum weighting dish. The dish was put into a Ziploc® bag, pressurized with nitrogen gas and placed in a 90° C. oven for 1 hour.

The samples were removed from the bag and washed with ethanol, isopropanol, ethanol, respectively for 30 minutes and then placed in 0.5 N NaCl at 80° C. for conditioning for 30 minutes, repeated with fresh 0.5 N NaCl solution at 80° C. conditioning for another 30 minutes and repeated at room temperature with a fresh NaCl solution.

Table 14 shown the results of area resistance in $\Omega$ cm$^2$ and their apparent permselectivity % of the CEM thus made: (also shown is a commercially available ion exchange membrane CMX coupon from Astom-Japan, 125 mm)

TABLE 14

| Description | Area Resistance ($\Omega$cm$^2$) | Apparent Permselectivity % |
|---|---|---|
| Astom CMX | 3.15 | 105.8 |
| Solupor 16P10A substrate | 1.40 | 100.1 |

From the results of these examples, it can be seen (e.g. Table 2) that the inventor has shown that using the inventive method thinner cation membranes can be made equal to thicker existing cation exchange membranes. The use of thinner membranes will provide for more productivity per unit volume of membrane module.

Abbreviations Used

AA Acrylic acid
NaSS Sodium styrene sulfonate
PySS Pyridinium Styrene Sulfonate
NMP N-methylpyrrolidone
DVB Divinylbenzene
MEHQ Hydroquinone monomethyl ether
CEM cation exchange membrane
2-SEM 2-sulfoethylmethacrylate
EP0409 Glycidyl-POSS®
POSS® polyhedral oligomeric silsequioxanes Experiment Procedures for Membrane Area Resistivity and Apparent Permselectivity Characterization The membrane resistance and counter ion transport number (permselectivity) can be measured using an electrochemical cell. This bench top experiment provides us with a very effective and quick experiment using a small piece of sample. The equipment and procedure are described here.

Experiment Preparation (1) Solartron 1280 Electrochemical Measurement Unit

The Solartron 1280 electrochemical measurement unit enables us to apply a current between the two platinum electrodes on the two sides of the cell and to measure the voltage drop across membrane. It has 4 connectors: work electrode (WE), counter electrode (CE), Reference electrodes (RE1 and RE2). The CE and WE are used to apply current and RE1 and RE2 to measure the voltage drop.

(2) Reference Electrodes

Reference electrodes (see the insert in FIG. 1) used for membrane characterization are made in R&D lab. ¾" glass tubing is softened, then bent and drawn to the form shown. A porous plug is inserted in the tip to control solution flow to a low rate.

Silver/silver chloride wire is freshly made for each day's testing. A current of 2-3 mA was supplied and controlled by a power supplier and an ampere meter to a platinum wire cathode and silver wire anode immersed in a 0.1N HCl solution. After several minutes, the sliver wire starts to turn black, indicating the formation of AgCl layer on the surface. The solution used inside the reference electrode tubing is 1.0M KCl solution. Since the solution will leak through the porous tip, constant addition of KCl is a necessary (every 20 min) during experiment.

(3) Membrane Test Cell

Figure 1:
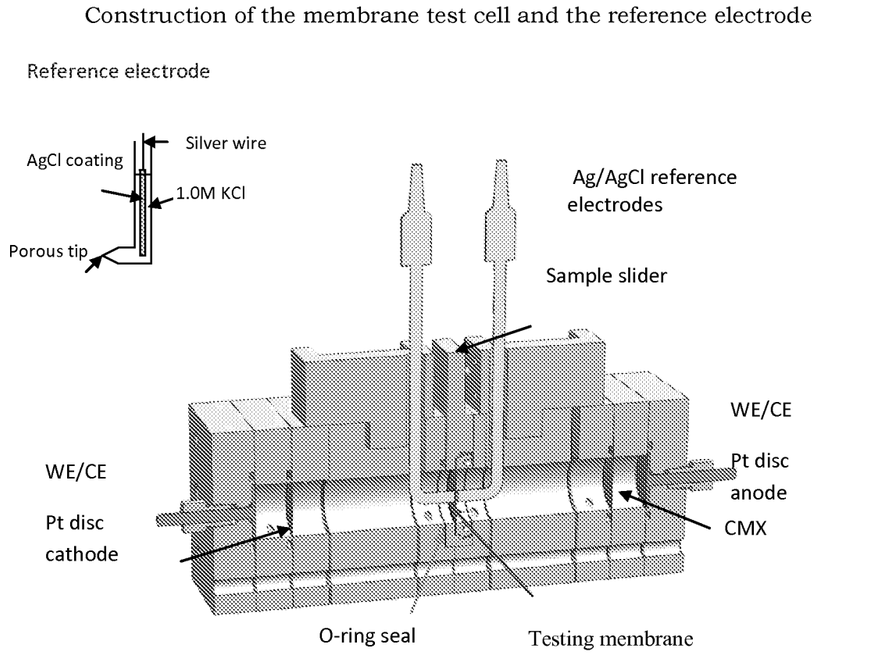
FIG. 1 shows the construction of the membrane test cell and the reference electrode.

FIG. 1 shows the detailed electrochemical testing cell construction used for the experiment to measure resistance and counter ion permselectivity of the membrane. The membranes are cut into disc using a die cutter. The reference electrodes are used to monitor the voltage drop across the testing membrane and the 2 platinum discs are used to provide a current through the membrane. The cylindrical path of the cell has a cross section area of 7.0 cm$^2$ (4) Solutions All the solutions need to be prepared with quantitative level as indicated by their significant figures. These includes 0.500N NaCl, 1.0N HCl and 1.0N NaOH (caustic, using plastic container or volumetric flask). The 0.5N Na$_2$SO$_4$ is used to feed the electrode compartments without evolution of chlorine gas.

3-III. Measurement Procedures (1) Resistance Measurement

Resistance here refers to area resistance $\Omega$-cm$^2$. The measurement contains 3 steps.
  (a) Set up electrode positions: Prior to a measurement, the reference electrode horizontal positions are set. To set reference electrode position, a rigid plastic disc is used as a stand-in for the membrane. Each reference electrode is adjusted to just touch the plastic disc and their position fixed by two set screws.
  (b) Measure the solution conductivity: The plastic disc was then removed and the two reference electrodes moved to 1.0 cm apart by removing the two 0.50 mm plastic blocks. The voltage drop between the two reference electrodes is recorded at an applied a current (~10-50 mA) by the Solartron 1280. The distance of the 2 reference electrodes (1.00 cm here), the current density (10.00 mA) and voltage (to 0.1 mV precision) used to obtain the conductivity of the solution (0.50 N NaCl typically.
  (c) Measuring membrane resistance: The membrane sample is then placed by the sample slider and the voltage and current measured again. The resistance of membrane is the total resistance less the solution resistance measured in procedure (b)

(2) Counter Ion Permselectivity (Transport Number)

The measurement procedures are:
  (a) Reference electrode position is set as described by part(a) of Resistance measurement. The reference electrodes position may be approximate since the voltage measured in this test is theoretically independent of the distance, but it is recommended that the position be located as reproducibly as possible.
  (b) Solutions: After emplacing the sample membrane with the slider, pour 0.500N NaCl solution in the right part of the cell separated by the testing membrane and 0.250NNaCl on the left side of the cell.
  (c) Measuring the voltage: the voltage was measured (without applying current) using a voltage meter attached to the platinum electrodes and data were entered the spreadsheet to obtain counter ion permselectivity.

3-IV. Sample Calculations:
C=conductivity (siemens/cm)
ρ=resistance (ohms/cm)
R=resistivity (ohm-cm² or Ω·cm²)
A=area (cm²)
U, V=measured voltage (mV)
I=measured current (mA)
L=distance between reference electrodes (1) Conductivity of the 0.500 M NaCl at 10.00 mA current and 33.1 mV measured for a reference electrode distance of 1.00 cm, the conductivity of solution:

$$C = \frac{1}{\rho} = \frac{L}{R} = \frac{L}{\frac{U}{I} \times A} = \frac{1.00 \text{ cm}}{\frac{33.1 \text{ mV}}{10.0 \text{ mA}} \times 7.00 \text{ cm}^2} = 0.0432 \text{ S/cm}$$

(2) Area resistance of the membrane calculation needs to subtract the solution resistance. For a CMX membrane with a measured potential of 38.0 mV, the area resistance is:

$$R = \frac{(38.1 - 33.1) \text{mV}}{10.0 \text{ mA}} \times 7.00 \text{ cm}^2 = 3.42 \text{ } \Omega \cdot \text{cm}^2$$

(3) Permselectivity (transport number) of cation(+) or anion(−) membrane $T_\pm$ is obtained by:

$$V = (2T_\pm - 1)\frac{RT}{F}\ln\frac{a_L}{a_R}$$

Which rearranges to;

$$2T_\pm = 1 + \frac{VF}{RT}\left(\ln\frac{a_R}{a_L}\right)$$

Where V is measured voltage by the reference electrodes, R is gas constant (8.314 Joule·K⁻¹·mole⁻¹) T is Kelvin temperature of solution, F is Faraday constant (96480 coulomb/mole) and $a_R$ and $a_L$ are concentration (activity format) of the solution on the two sides of the membrane in the cell.

The invention claimed is:

1. A process for producing a cation exchange membrane, comprising:
   forming a first suspension of a metal salt of styrene sulfonate in an organic solvent;
   adding pyridinium chloride to said first suspension to form a second suspension;
   promoting a reaction in the second suspension to form a metal chloride byproduct precipitate and a monomer solution of styrene sulfonic acid, or a pyridine salt of styrene sulfonic acid, or a mixture of both styrene sulfonic acid and a pyridine salt of styrene sulfonic acid, in said organic solvent;
   collecting the monomer solution;
   providing a porous substrate;
   saturating porous regions of the substrate with a solution comprising the monomer solution, a crosslinking monomer, and a polymerization initiator;
   removing excess solution from the saturated porous substrate; and
   initiating polymerization to form a crosslinked ion transferring polymer in the porous regions of the substrate.

2. The process of claim 1, wherein the porous substrate comprises polypropylene, high molecular weight polyethylene, ultrahigh molecular weight polyethylene, or polyvinylidene fluoride.

3. The process of claim 1, wherein a thickness of the porous substrate is greater than about 55 microns and less than about 155 microns.

4. The process of claim 1, wherein a thickness of the porous substrate is greater than about 20 microns and less than about 55 microns.

5. The process of claim 1, wherein the solution further comprises 2 sulfoethylmethacrylate (2-SEM), 2-acrylamide-2-methyl propane sulfonic acid (AMPS), or acrylic acid.

6. The process of claim 1, wherein the solution further comprises a secondary monomer selected from the group consisting of: styrene, vinyl toluene, 4-methylstyrene, t-butyl styrene, alphamethylstyrene; methacrylic anhydride, methacrylic acid, n-vinyl-2-pyrolidone, vinyltrimethoxysilane, vinyltriethoxysilane, vinyl-tris-(2-methoxyethoxy)silane, vinylidene chloride, vinylidene fluoride, vinylmethyldimethoxysilane, 2,2,2,-trifluroethyl methacrylate, maleic anhydride, glycidyl methacrylate, hydroxyethylmethacrylate, methylmethacrylate, $(C_8H_{13}O)_n(SiO_{1.5})_n$, wherein n=8, 10, or 12, $(C_6H_{11}O_2)_n(SiO_{1.5})_n$, wherein n=8, 10, or 12, $(C_7H_{11}O_2)_n(SiO_{1.5})_n$, wherein n=8, 10, or 12, $(C_6H_9O_2)_n(SiO_{1.5})_n$, wherein n=8, 10, or 12, $C_{56}H_{104}O_{30}S_3Si_{10}$, and $C_{70}H_{132}O_{30}S_3Si_{10}$.

7. The process of claim 1, wherein the crosslinking monomer is selected from the group consisting of: divinylbenzene, ethylene glycol dimethacrylate, propylene glycol dimethacrylate, isobutylene glycol dimethacrylate, $C_{16}H_{24}O_{12}Si_8$, $C_{32}H_{72}O_{20}Si_{16}$, $(CH_2CH)_n(SiO_{1.5})_n$, wherein n=8, 10, or 12, $C_{14}H_{38}O_{12}Si_7$, $C_{28}H_{66}O_{12}Si_7$, $C_{56}H_{122}O_{12}Si_7$, $C_{16}H_{56}O_{20}Si_{16}$, and $H_8O_{12}Si_8$.

8. The process of claim 1, wherein the polymerization initiator is selected from the group consisting of organic peroxides, 2,2'-azobis[2,(2-imidazolin-2-yl)-propane]dihydrochloride, a,a'-azoisobutyronitrile, 2,2'-azobis(2-methylpropioaminidine dihydrochloride, 2,2'-azobis[2,(2-imidazolin-2-yl)-propane], and dimethyl 2,2'-azobis(2-methylpropionate).

9. The process of claim 1, further comprising removing volatile species from the monomer solution under conditions that volatilize less than about 5% of said organic solvent by weight.

10. The process of claim 1, wherein polymerization is initiated by the application of heat, ultraviolet light, or ionizing radiation.

11. The process of claim 1, wherein polymerization is carried out substantially in the absence of oxygen.

12. The process of claim 1, wherein the porous substrate comprises pores having a size of about 0.1 microns to about 0.2 microns.

13. The process of claim 1, wherein the pyridine salt of styrene sulfonic acid is a saturated pyridine salt of styrene sulfonic acid in said organic solvent.

14. The process of claim 1, wherein the organic solvent is a dipolar aprotic solvent.

15. The process of claim 14, wherein the dipolar aprotic solvent is N-methylpyrrolidone (NMP).

16. The process of claim 1, wherein promoting the reaction in the second suspension comprises heating the second suspension to a temperature above 80° C. to form the metal chloride byproduct precipitate and a monomer solution of styrene sulfonic acid in the organic solvent.

17. The process of claim 1, wherein promoting the reaction in the second suspension is performed at a temperature below 80° C. to form the metal chloride byproduct precipitate and a monomer solution of the pyridine salt of styrene sulfonic acid in the organic solvent.

18. A process for producing a cation exchange membrane, comprising:
   forming a first suspension of sodium styrene sulfonate in an organic solvent;
   adding pyridinium chloride to the first suspension to form a second suspension;
   promoting a reaction in the second suspension to form a sodium chloride byproduct precipitate and a monomer solution of styrene sulfonic acid, or pyridinium styrene sulfonate, or a mixture of both styrene sulfonic acid and pyridinium styrene sulfonate, in the organic solvent;
   collecting the monomer solution;
   providing a porous substrate;
   saturating porous regions of the substrate with a solution comprising the monomer solution, a crosslinking monomer, and a polymerization initiator;
   removing excess solution from the saturated porous substrate; and
   initiating polymerization to form a crosslinked ion transferring polymer in the porous regions of the substrate.

* * * * *